May 31, 1932.    F. NAGLER    1,860,618
HYDRAULIC TURBINE
Filed Aug. 8, 1930    2 Sheets-Sheet 1
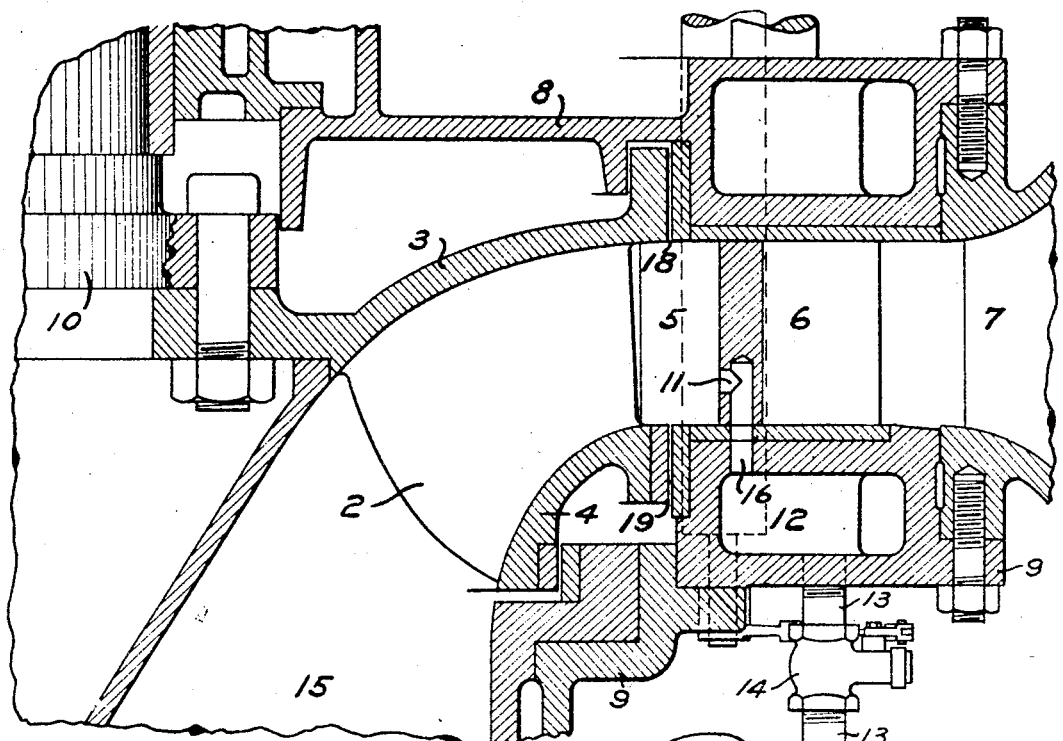
Fig. 1
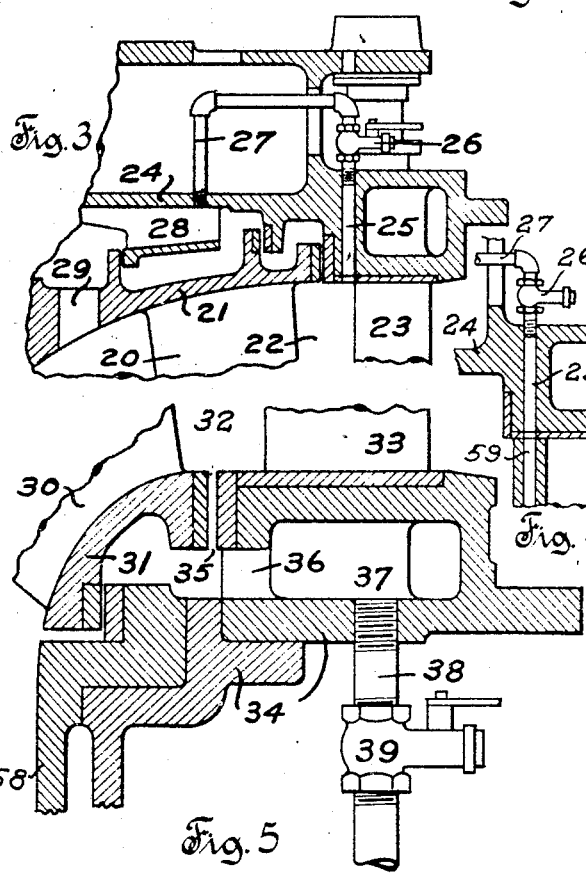
Fig. 3
Fig. 4
Fig. 5
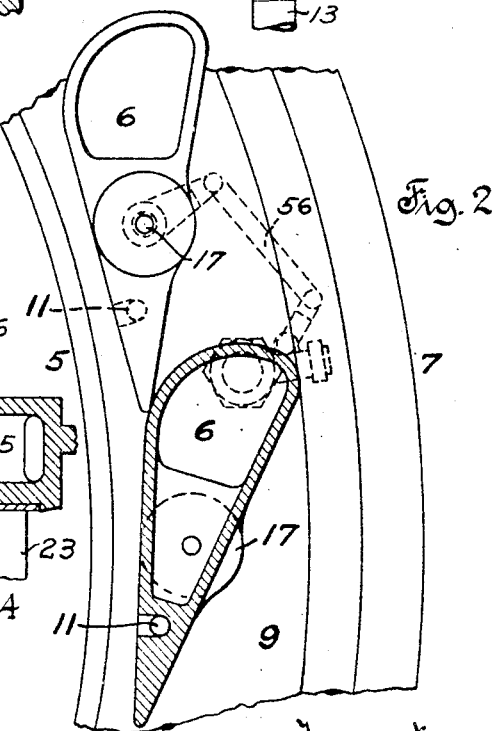
Fig. 2
Inventor
F. Nagler
by G. W. D'Ulvin
Attorney

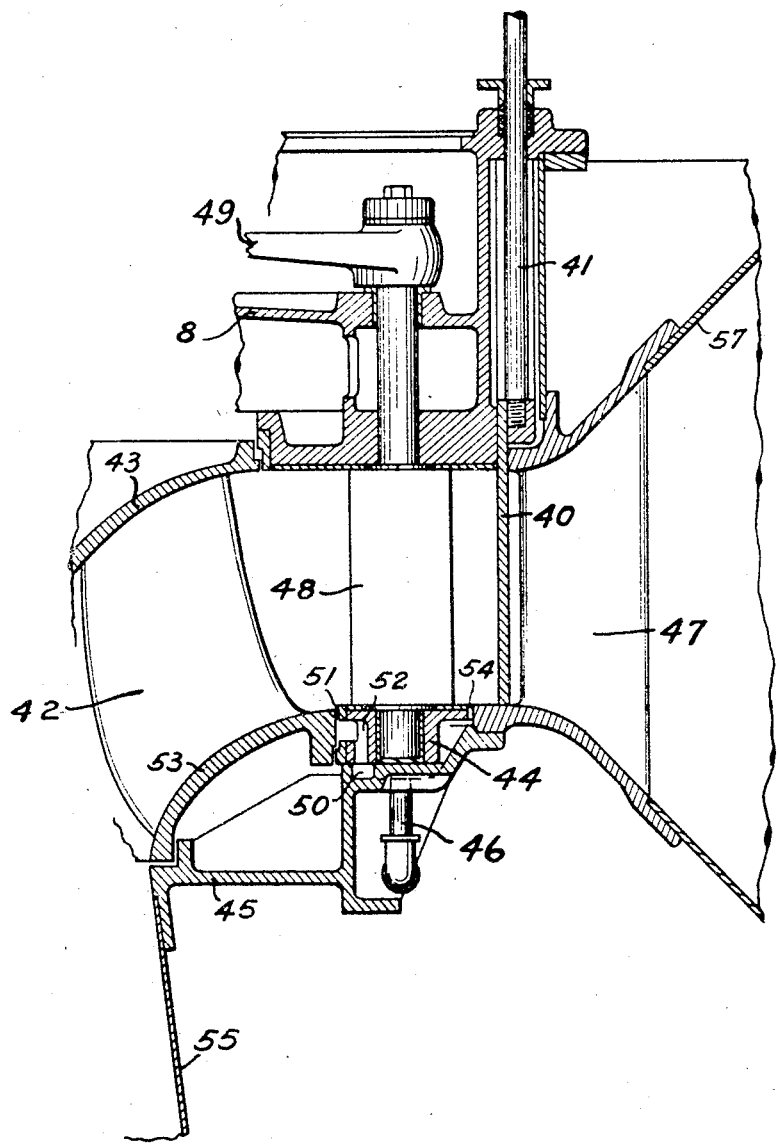

Patented May 31, 1932

1,860,618

UNITED STATES PATENT OFFICE

FORREST NAGLER, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

HYDRAULIC TURBINE

Application filed August 8, 1930. Serial No. 474,037.

This invention relates in general to the art of hydraulic machines and relates more specifically to means for draining the inlet space between the runner of a hydraulic turbine and the flow control means when the latter is in closed position, and the runner driven independently of the hydraulic motive fluid.

An object of the invention is to provide means for eliminating the annular column of water which is formed by leakage past the flow control means of a hydraulic turbine which would otherwise be churned around within the confines of said control means by the runner when the alternator of the hydro-electric unit is operating as a synchronous condenser or in other words, as an overexcited synchronous motor, and constitute a drag on the unit representing a needless waste of power. It is desirable to have the flow control means operate against penstock pressure when the alternator of a hydro-electric unit comprising a hydraulic turbine directly connected to an alternator is operating as a synchronous condenser or as an overexcited synchronous motor to rotate the runner of the unit independently of the hydraulic motive fluid, so that the flow control means need merely be opened by the governor when a sudden requirement for more electrical power arises to cause the alternator of the unit to again operate as a generator to supply the increased power.

Another object of the invention is to provide means for draining outside of the runner of a hydraulic machine directly connected to a dynamo electric machine when a hydro-electric unit so constituted is electrically driven by said dynamo electric machine operating for the time being as an overexcited synchronous motor to boost the power factor of the line, which is simple and inexpensive to install and efficient in operation. Other objects and advantages of the present invention will be apparent from a reading of the specification and the drawings accompanying the specification and forming a part thereof.

On the drawings:

Fig. 1 is a partial longitudinal vertical sectional view through the guide casing of a hydraulic turbine provided with one form of draining means.

Fig. 2 is a partial plan view of the guide casing illustrated in Fig. 1, showing one of the guide vanes in transverse section.

Fig. 3 is a partial longitudinal vertical section of a guide casing similar to Fig. 1, provided with a modified form of draining means.

Fig. 4 is a fragmentary sectional view of the guide casing and draining means shown in Fig. 3 modified in that each vent in the guide casing top registers or communicates with a vent in a guide vane, opening toward the inlet space when the guide vanes are in closed position.

Fig. 5 is a partial longitudinal vertical section of a guide casing provided with another modified form of draining means.

Fig. 6 is a partial longitudinal vertical section of a guide casing, provided with a cylindrical gate and means for simultaneously draining inside and outside of the guide vanes.

Referring to Fig. 1, 8 represents the top and 9 the bottom which together form a guide casing within which a runner detachably connected to the shaft 10 of a dynamo electric machine, rotates. The runner consists of a crown 3, vanes 2 depending therefrom and a band 4. The inner portions of the opposed faces of the crown 3 and band 4 of the runner provide an axial flow portion while the outer portions of these faces are formed to communicate with the annular passage between top 8 and the bottom 9 of the guide casing which passage is controlled by adjustable guide vanes 6. This passage communicates with a conduit 7 leading to a penstock, not shown. Below the runner is a draft tube 15 which may be supplied with air to break the vacuum which forms therein when the runner rotates, to drop the tail-race level below the runner which is desirable when the hydro-electric unit is electrically driven by the dynamo electric machine operating for the time being as an overexcited synchronous motor to boost the power factor of the line to which it is paralleled. Between the runner crown 3 and the top 8 of the guide casing is an enlarged clearance space 18. Another smaller clearance space 19 also at the outer diameter of the runner is provided between the band 4 and adjacent portion of the bottom 9 of the guide casing. Each of the guide vanes 6 is provided with a vent 11 opening towards the inlet space 5 between the rotating runner and the closed vanes 6. These vents in the closed position of the guide vanes 6 register with ports 16 leading into drain chamber 12 in the bottom 9 of the guide casing. One or more discharge pipes 13 having valves 14 directly controlled by the guide vanes 6 through mechanism 56 establishes communication between the chamber 12 and the draft tube 15. The mechanism 56 is so designed that the valves 14 will be opened thereby when the guide vanes are in closed position.

The operation of this form of venting means is as follows: While the shaft 10 is driven by the alternator, not shown, operating as a synchronous condenser, that is, as an overexcited synchronous motor to boost the power factor of the line to which it is paralleled, and with air admitted into the draft tube 15 to lower the tail-race level therein, below the runner, the runner will rotate and the centrifugal force thereby set up will cause a certain unit pressure to act upon unit mass of water that has leaked past the closed guide vanes 6 and which forms an annular body of water in the inlet space 5, between said runner and said closed guide vanes. On the other side of this annular body of water, rotated at a certain speed by the runner, the unit pressure of the water in the conduit 7 will act. Water will continue to leak past the guide vanes 6 until the pressure due to the centrifugal force acting on the masses constituting the body of water in inlet space 5 equals the unit pressure of the water in the conduit 7. The pressure in the body of water in inlet space 5 will then vary from atmospheric pressure at any point in the outer periphery of movement of the runner to conduit pressure at any point adjacent the inner surface of guide vanes 6. This water will drain through vents 11, ports 16, chamber 12, pipes 13 to the draft tube 15. As this water drains the annular body of water in inlet space 5 becomes narrower, or in other words its inner diameter increases and the pressure at that increased diameter becomes atmospheric while the pressure at the inner surface of the guide vanes is also decreased in the same proportion. This decrease in width of the annular body of water in inlet space 5 continues and the pressure adjacent the inner surface of the guide vanes falls off by a definite amount until no water is left in the space 5. The runner will then rotate merely against the relatively small resistance offered by the air filling space 5.

Now referring to Fig. 3, 24 is the top of the guide casing which has vents 25 communicating with inlet space 22 inside of the guide vane inner surfaces when the guide vanes 23 are in closed position, as shown. These vents communicate with the space above the runner crown 21 through pipes 27 controlled by valves 26. Valves 26 may be automatically operated from the guide vanes as illustrated in Figs. 1 and 2 or be manually operated. Depending from the top 24 of the guide casing is a trough 28 which causes the water from pipes 27 to flow through the ports 29 in the runner crown 21, ports 29 being preferably inclined in the direction of rotation of the runner, and thence into the draft tube. Reference numeral 20 represents the runner vanes, 22 the inlet space, corresponding to inlet space 5 of the modification illustrated by Figs. 1 and 2, and 23 the guide vanes.

The operation of this form of draining means takes place under the same conditions and in the manner stated in the description of the operation of the draining means of Figs. 1 and 2. The water in this case, however, first flows from inlet space 22 upwardly in vents 25, which may be located diametrically opposite each other, and then through pipes 27 over shelf 28 and onto the runner crown 21 and through ports 29 therein, into the draft tube, not shown.

Fig. 4 shows the draining means of Fig. 3 modified in that the vents 25 instead of communicating directly with the inlet space 22 communicate therewith through the intermediary of vents 59 in the guide vanes. Vents 59 open into the inlet space 22, as illustrated in Figs. 1 and 2, when the guide vanes are in closed position.

Fig. 5 shows means for draining through the runner clearance. This is accomplished by providing the bottom 34 of the guide casing with a passage or passages 36 leading into chamber 37 thereof and which are in open communication with clearance space 35 between the outer diameter portion of the runner band 31 and the adjacent portion of the bottom 34 of the guide casing. Clearance 35 is made larger than the clearance space between the inner diameter portion of the runner band 31 and the adjacent draft tube portion 58. This clearance space communicates with a pressure pocket under the runner band 31, which serves to sustain some of the weight of the rotating runner. 30 represents the runner vanes, 33 the adjustable guide vanes and 32 the inlet space. 38 is a discharge pipe, of which a plurality may be provided, communicating at its upper end with the chamber 37 and at its lower end with the draft tube, a valve 39 being provided in each pipe 38, said valves being automatically operable by the guide vanes as illustrated by Figs. 1 and 2 or manually, for the purpose of controlling the communication between chamber 37 and the draft tube.

The operation of this form of draining means takes place under the same conditions and in the manner stated in the descriptions of the draining means of Figs. 1, 3 and 4. The water in inlet space 32 draining through clearance space 35, passages 36, chamber 37, pipes 38 and finally into the draft tube.

Fig. 6 shows means for draining simultaneously inside and outside of the guide vane circle in a turbine provided with a cylindrical gate which may take the place of the usual butterfly shut-off valve remote from the guide casing. 43 represents the runner crown, 42 the runner vanes and 53 the runner band. 8 is the top of the guide casing through which the upper portions of the guide vane pivots pass which are connected with the usual shifting ring, not shown, by means of levers 49. The lower portions of the guide vane pivots are journaled in a guide vane ring 44 which engages with the basin portion 50 of a discharge ring 45. The inlet conduit 57 is formed in part by the usual speed ring 47. A cylindrical gate 40 which in its closed position rests upon the inner surface of the speed ring 47 slides in an annular slot between the top 8 of the guide casing and speed ring 47. Gate rods 41 may be provided for operating the gate and which reciprocate in and are guided by a suitable frame structure which may be integral with the top 8 of the guide casing. Stationary clearance or vent 54 is provided between the guide vane ring 44 and the adjacent portion of speed ring 47. This vent is outside of the guide vane circle when the guide vanes 48 are closed and therefore is not covered by the guide vanes 48 in their closed position, as shown. The leakage water held between the guide vanes 48 and the closed cylindrical gate 40 is therefore, free to drain, due to the pressure of said water, through vent 54 into basin portion 50 and from there into the pipes 46 which empty into the draft tube 55. While the water leaking into the inlet space between the inner surface of the guide vanes 48 and the outer peripheral portions of the runner is permitted to drain under the influence of its pressure and that due to gravity through the clearance space 51 between the outer diameter portion of the runner band 53 and the ring 44, said ring being provided with a passage 52 communicating with clearance space 51 and the basin portion 50 of discharge ring 45 so that the basin portion may also receive this water from which it flows with water passing through vent 54 into the draft tube 55 by means of pipes 46. By providing the cylindrical gate 40 as illustrated by the arrangement in Fig. 6 draining may be done outside of the runner as generally illustrated in Figs. 1, 3, 4 and 5 and in addition thereto a simultaneous draining of water collecting in a certain space outside of the guide vanes 48 may be carried out.

By draining outside of the runners in hydraulic turbines having runners characterized by the fact that they tend to pump water outwardly towards the turbine inlet, as disclosed in this application, the efficiency of a hydro-electric unit comprising such a hydraulic turbine directly connected to an alternator, when said alternator is operating as a synchronous condenser is materially enhanced. The draining eliminates the leakage water surrounding the rotating runner which would otherwise be a drag thereon which would represent a very appreciable waste of energy and unnecessary idle losses.

The valve operating mechanism 56 shown in Figs. 1 and 2 may be employed to operate the valves 26 and 39 of Figs. 3, 4 and 5, respectively. The essential elements of mechanism 56 are a lever that is movable with a guide vane and a link pivotally connecting the free end of this lever with the lever of the discharge valve in such a manner so that the discharge valves in the drain pipes will be open when the guide vanes are in closed position.

It should be understood that it is not desired to limit the invention to the exact details of construction herein shown and described, for obvious modifications may occur to a person skilled in the art.

It is claimed and desired to secure by Letters Patent:

1. In a hydro-electric unit comprising a hydraulic machine direct-connected to a dynamo electric machine, a casing defining an annular passage, a runner rotatable within said casing and located radially within said passage, flow control means in said passage and means for draining the space between the runner periphery and said flow control means when the latter is in closed position and the unit is electrically driven by said dynamo electric machine.

2. In a hydro-electric unit comprising a hydraulic machine direct-connected to a dynamo electric machine, a casing defining an annular passage, a runner rotatable within said casing and located radially within said passage, a plurality of adjustable members in said passage and means including vents in said members for draining the space between the runner periphery and said members when they are in closed position and the unit is electrically driven by said dynamo electric machine.

3. In a hydro-electric unit comprising a hydraulic machine direct-connected to a dynamo electric machine, a casing defining an annular passage, a runner rotatable within said casing and located radially within said passage, an annular series of adjustable guide vanes in said passage and means including vents in said guide vanes for draining the space between the runner periphery and said guide vanes when they are in closed position and the unit is electrically driven by said dynamo electric machine.

4. In a hydro-electric unit comprising a hydraulic machine direct-connected to a dynamo electric machine, a casing defining an annular passage, a runner rotatable within said casing and located radially within said passage, flow control means in said passage and means including a vent in the top wall of said casing for draining the space between the runner periphery and said flow control means when the latter is in closed position and the unit is electrically driven by said dynamo electric machine.

5. In a hydro-electric unit comprising a hydraulic machine direct-connected to a dynamo electric machine, a casing having a top and defining an annular passage, a runner rotatable within said casing and located radially within said passage, an annular series of adjustable guide vanes in said passage and means including a vent in said casing top for draining the space between the runner periphery and said guide vanes when they are in closed position and the unit is electrically driven by said dynamo electric machine.

6. In a hydro-electric unit comprising a hydraulic machine direct-connected to a dynamo electric machine, a casing defining an annular passage, a runner rotatable within said casing and located radially within said passage, an enlarged clearance space between said runner and the bottom wall of said casing, flow control means in said passage and means including a passage in the bottom wall of said casing, communicating with said runner clearance space for draining the space between the runner periphery and said flow control means when the latter is in closed position and the unit is electrically driven by said dynamo electric machine.

7. In a hydro-electric unit comprising a hydraulic machine direct-connected to a dynamo electric machine, a casing having a bottom and defining an annular passage, a runner rotatable within said casing and located radially within said passage, an enlarged clearance space between said runner and said casing bottom, an annular series of adjustable guide vanes in said passage and means including a passage in said casing bottom, communicating with said runner clearance space for draining the space between the runner periphery and said guide vanes when they are in closed position and the unit is electrically driven by said dynamo electric machine.

8. In a hydro-electric unit comprising a hydraulic machine direct-connected to a dynamo electric machine, a casing defining an annular passage, a runner rotatable within said casing and located radially within said passage, flow control means in said passage and means including vents in said flow control means for draining the space between the runner periphery and said flow control means when the latter is in closed position and the unit is electrically driven by said dynamo electric machine.

9. In a hydro-electric unit comprising a hydraulic machine direct-connected to a dynamo electric machine, a casing defining an annular passage, a runner rotatable within said casing and located radially within said passage, flow control means in said passage, another flow control means in said passage surrounding and spaced from said former flow control means, and means for draining the spaces between the runner periphery and said latter flow control means when the flow control means are in closed position and the unit is electrically driven by said dynamo electric machine.

In testimony whereof, the signature of the inventor is affixed hereto.

FORREST NAGLER.